July 9, 1946.  T. A. MARTIN  2,403,870
BRAKE CONTROL FOR MOTOR VEHICLES
Filed June 6, 1944  2 Sheets-Sheet 2
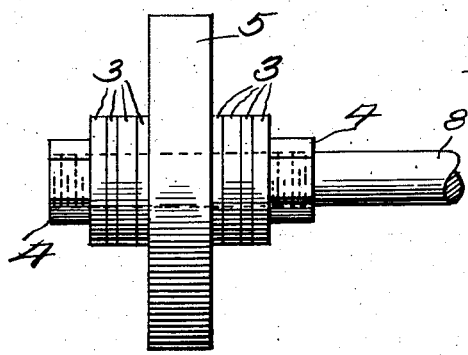
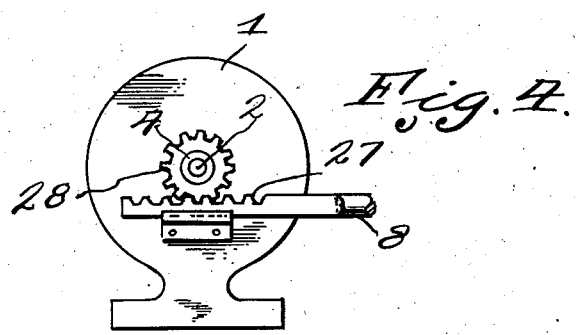
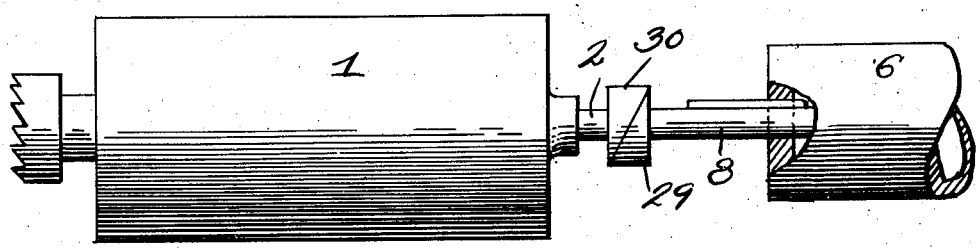
Inventor
Thomas A. Martin
By Philip A. H. Sewell
his Attorney Patented July 9, 1946

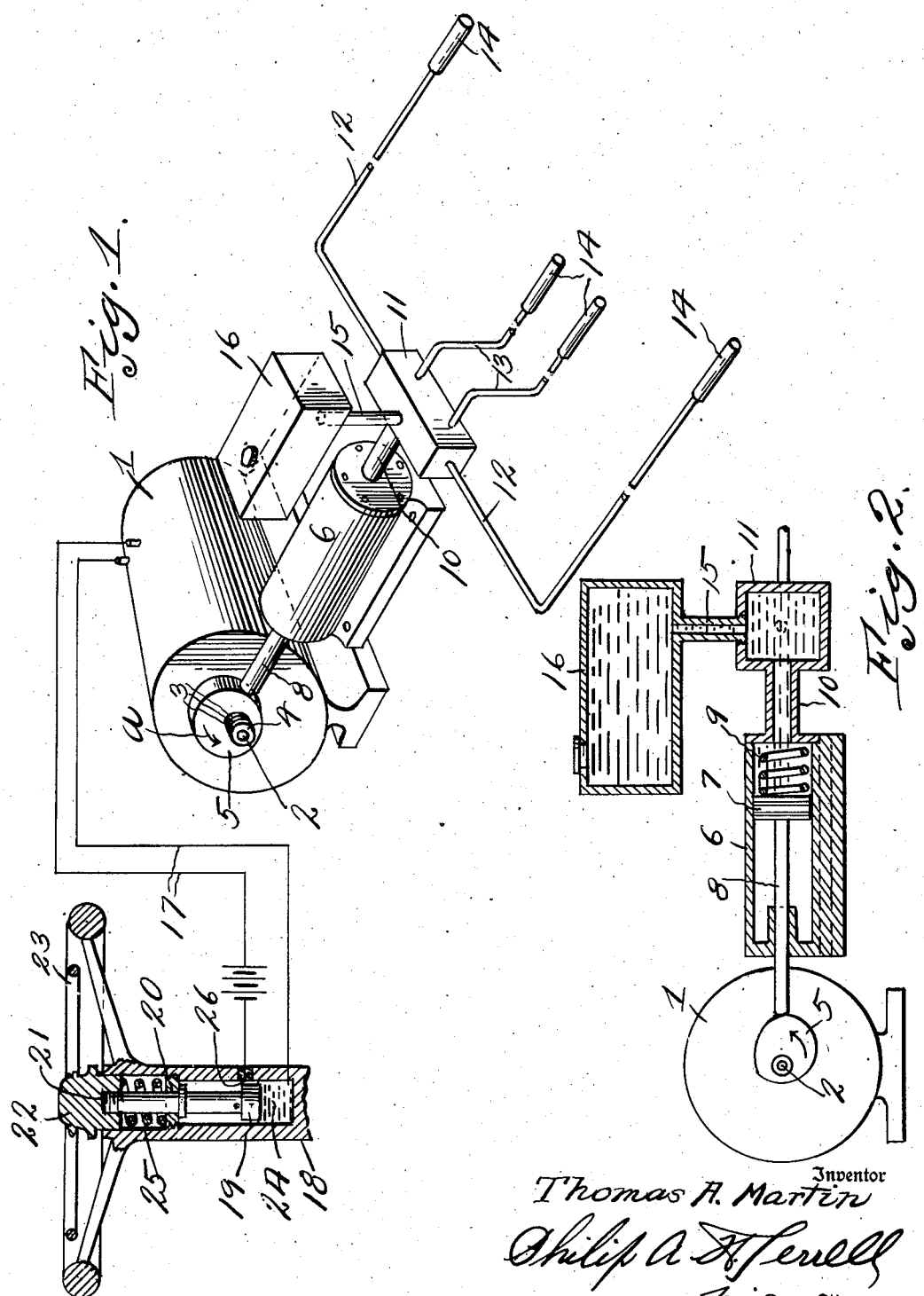

2,403,870

UNITED STATES PATENT OFFICE 2,403,870

BRAKE CONTROL FOR MOTOR VEHICLES

Thomas A. Martin, Jamaica, N. Y.

Application June 6, 1944, Serial No. 538,949

4 Claims. (Cl. 188—152)

The invention relates to brakes for motor driven vehicles of the fluid type, and has for its object to provide means whereby the brake is controlled from the starter motor and preferably from the steering wheel.

A further object is to provide one end of the starter motor shaft with means cooperating with a piston rod for forcing fluid from a cylinder to the brakes. Also to provide a reservoir in connection with the device whereby additional fluid may be placed in the system when desired.

A further object is to provide the starter motor with a frictionally held cam for forcing the piston rod and piston inwardly in the cylinder against the action of an expansion spring for a braking operation.

A further object is to provide a mercury switch on the steering wheel within easy reach of the operator for closing a circuit to the starter motor when a braking operation is desired.

A further object is to provide means whereby the frictionally held cam will move only a limited distance before slipping, thereby preventing the brakes from becoming set, and at the same time allowing the expansive action of the expansion spring against the piston, within the cylinder, to return the cam to inoperative position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the device.

Figure 2 is a vertical longitudinal sectional view through the device showing the same in operated position.

Figure 3 is a side elevation of the frictionally held cam.

Figure 4 is an end view of the starter motor showing the gear and rack operating means.

Figure 5 is a top plan view of the starter motor and a portion of the cylinder, showing a cam operating means.

Referring to the drawings, the numeral 1 designates a conventional form of starter motor and 2 the shaft thereof opposite the engine starting portion of the starter motor.

Frictionally held on the shaft 2 by means of a plurality of frictional discs 3, between adjusting nuts 4, is a cam 5, which cam is partially rotated in the direction of the arrow $a$ for a braking operation. The cam 5 moves only a limited distance so it cannot stop on dead center before it slips. Disposed to one side of the motor 1 is a fluid cylinder 6, in which cylinder is slidably mounted a piston 7. The piston 7 is provided with a piston rod 8 which extends outwardly and engages the cam 5, as clearly shown in Figure 2, and is normally forced towards the cam by the expansion spring 9 within the cylinder.

The fluid from the cylinder is forced through a branch pipe 10 into a manifold 11, and thence through pipes 12 and 13 leading respectively to the forward and rear wheels of the vehicle and to the usual cylinders 14 for operating the brakes. When the starter motor is stopped the expansion spring 9 expands and the shaft 2 is partially rotated and the pressure, through the manifold 11 to the cylinders 14, is released, thereby relieving the braking operation. Extending upwardly from the manifold 11 is a pipe 15 which leads to a reservoir 16 in which fluid is placed, as desired, to maintain a closed system.

The starter motor 1 is operated for braking purposes through a circuit 17, leading to a mercury switch on the steering column 18. The mercury switch preferably comprises a vertically slidable plunger 19 which extends through a bearing of a bushing 20 and is anchored at 21 to a head 22 having an annular member 23 within reach of the fingers of the operator for forcing the head 22 downwardly and the plunger into the mercury body 24 against the action of a spring 25, thereby causing the liquid level of the mercury to rise and close the circuit at 26 to the starter motor, therefore it will be seen that the device is controlled from the steering wheel for braking operations.

Referring to the modified form shown in Figure 4, the piston rod 8 is provided with a rack 27, which rack meshes with a clutch held gear 28 on the motor shaft 2, otherwise the operation is the same as shown in Figure 1.

Referring to Figure 5, showing another modification, the piston rod 8 is provided with a cam member 29 which cooperates with a cam member 30 on the starter motor shaft 2. In this form, the starter motor 1 and cylinder 6 are in axial alinement.

From the above it will be seen that a means is provided for controlling a fluid braking operation from one end of a starter motor and that the device is controllable from the steering wheel, within easy reach of the operator.

The invention having been set forth, what is claimed as new and useful is:

1. A fluid brake operating means comprising a starter motor, a fluid cylinder adjacent the starter motor, a piston within said cylinder and adjacent the starter motor, a piston rod carried by said piston at an angle to the axis of the starter motor, said cylinder having conduit connections with the brakes and a rotatable frictionally held member carried by the starter motor and cooperating with the piston rod for moving the same longitudinally.

2. A device as set forth in claim 1 wherein the motor carried member for moving the piston rod comprises a frictionally held cam mounted on the starter motor shaft and engaging the piston.

3. A device as set forth in claim 1 including an expansion spring cooperating with the piston within the cylinder for normally forcing the piston rod towards the starter motor frictionally held member.

4. A device as set forth in claim 1 including means for adjusting the frictional holding of the piston operating member carried by the starter motor.

THOMAS A. MARTIN.